BEST AVAILABLE COPY

Dec. 11, 1928. Re. 17,161

W. INNES

TURBINE GOVERNING SYSTEM

Original Filed Aug. 3, 1923

WITNESSES:
E. Lutz.

INVENTOR
William Innes
BY
A. B. Reavis
ATTORNEY

BEST AVAILABLE COPY

Reissued Dec. 11, 1928. Re. 17,161

UNITED STATES PATENT OFFICE.

WILLIAM INNES, OF MONKSEATON, ENGLAND, ASSIGNOR TO WESTINGHOUSE ELECTRIC AND MANUFACTURING COMPANY, A CORPORATION OF PENNSYLVANIA.

TURBINE-GOVERNING SYSTEM.

Original No. 1,669,522, dated May 15, 1928, Serial No. 655,527, filed August 3, 1923, and in Great Britain August 4, 1922. Application for reissue filed October 10, 1928. Serial No. 311,683.

This invention relates to the governing of steam engines and has for its object to provide improved means for the prevention of overspeeding on a sudden removal or reduction of load.

In accordance with the present invention, the governing system comprises a governor responsive to load variations of the engine and adapted to be associated with a governor responsive to speed, together with means adapted to render the load governor irresponsive to variations which are sufficiently gradual to be controlled by the speed governor. The speed governor may be of any suitable or well-known type and the load governor preferably comprises an electrical device responsive to the current or voltage of, or to the power absorbed in, an electrical circuit forming the whole or part of the load on the engine. The means adapted to render the load governor irresponsive to variations which are sufficiently gradual to be controlled by the speed governor may comprise a switch included in the aforesaid circuit and controlled by operating mechanism responsive to variations in the fluid pressure within the engine.

Figure 1:
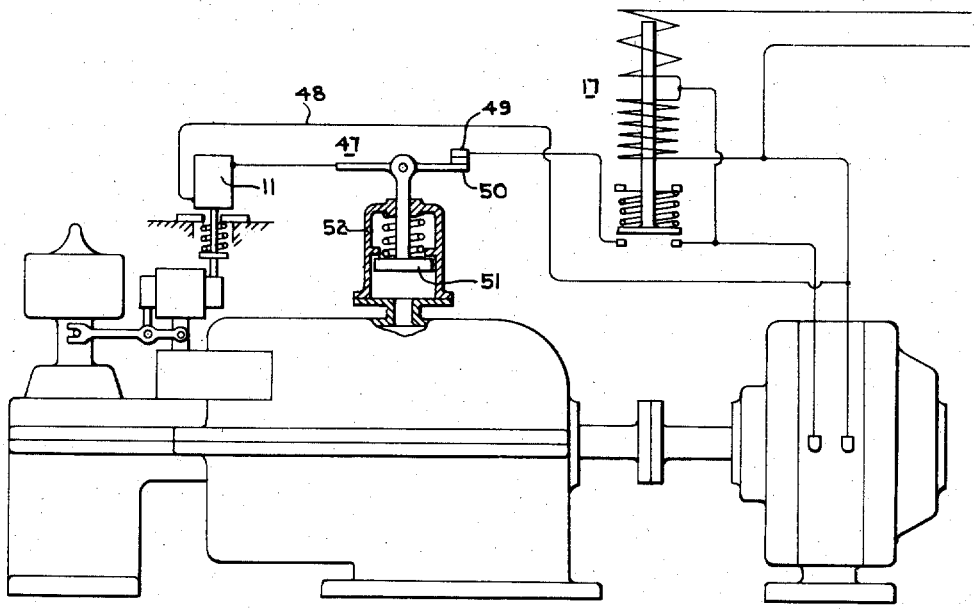
Figure 2:
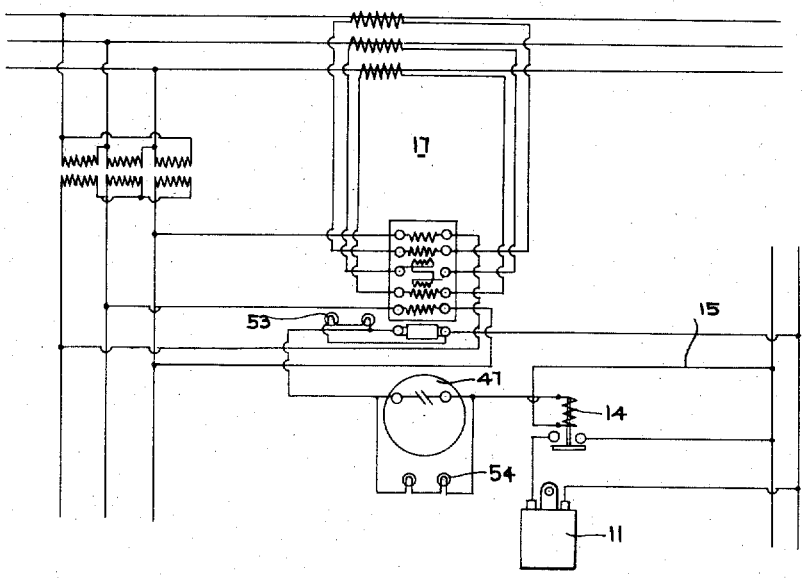

In order that the invention may be more clearly understood and readily carried into practice, an application of the same to a governing system will now be described by way of illustration or example, reference being made to the accompanying drawings wherein Figs. 1 and 2 are diagrammatic representations of the invention.

Referring first to Fig. 1, the solenoid 11 which controls the governor or by-pass valve is here included in series with a wattmeter relay 17 and a regulating switch 47 in a circuit 48 fed from a generator driven by a turbine. The regulating switch 47 constitutes the particular feature of the present application and comprises fixed and movable contacts 49 and 50, the latter of which is connected with a spring pressed piston 51 contained within a cylinder 52 adapted to be connected to a region of pressure within the interior of the turbine.

In operation the ordinary speed governor responds to speed variations in the usual manner while the wattmeter relay 17 responds to load variations without the normal range. Any comparatively gradual reduction in load such as can be controlled by the ordinary speed governor is accompanied by a corresponding drop in pressure within the turbine and therefore within the cylinder 51. This drop in pressure results in a downward movement of the piston 51 and the breaking of the circuit 48 at the contacts 49 and 50, thereby rendering the wattmeter relay 17 ineffective and preventing the energization of the solenoid 11. In the event, however, of a sudden reduction in load without the normal limits of operation, the pressure in the cylinder 52 is maintained until the speed governor operates with the result that the wattmeter relay 17, which responds immediately to the load variation, completes the circuit 48 through the solenoid 11, thereby energizing the latter and causing the prompt operation of the governor or by-pass valve to which the solenoid 11 may be connected.

Referring now to Fig. 2, the regulating device 47 is here included in the circuit 15 in series with the wattmeter relay 17 and operating coil of the contactor switch 14 as shown, with the result that in the event of any gradual reduction in load, such as can be controlled by the ordinary speed governor the wattmeter relay 17 and contactor switch 14 are rendered ineffective, whereas a sudden drop in load results in the completion of the circuit 15 and the operation of the solenoid 11 in the manner described.

Indicating or signal lamps or other alarm devices may be included in the circuit of the relay, as indicated at 53, 54, which will show whether the relay contacts or the regulating switch 47 are open or closed.

Although one particular application of the invention has been described by way of illustration or example, it will be clearly understood that numerous other forms and applications are possible. For instance an ammeter or voltmeter relay responsive to the current or voltage of the circuit constituting the whole or part of the load on the engine may be substituted for the wattmeter relay, or the solenoid may be adapted to be energized during normal operation and to effect the closure of the governor or the by-pass valve by its de-energization. In the latter case the relay may be adapted to break the circuit on a given variation of current, voltage or load and the regulating device may be connected in parallel with the relay and adapted to close the circuit on a predetermined fall in pressure within the engine.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

Having now particularly described and ascertained the nature of my said invention and in what manner the same is to be performed, I declare that what I claim is:

1. In an emergency governor for a turbine driving an electric generator, electrically operated means effective to control the turbine, a circuit for the electrically operated means and means responsive to pressure within the turbine together with means responsive to variations in electric load on the generator for controlling the circuit.

2. In an emergency governor for a turbine driving an electric generator, means including a solenoid effective to control the turbine, an electric circuit for the solenoid, a pair of electric switches in series effective to complete said circuit, and means responsive to pressure within the turbine together with means responsive to variations in electric load on the generator for operating the switches.

3. In an emergency governor for a turbine driving an electric generator, means including a solenoid effective to control the turbine, an electric circuit for the solenoid, a pair of electric switches effective when both are closed to complete the circuit and energize the solenoid, means responsive to pressure within the turbine for operating one of the switches and effective upon normal conditions of pressure in the turbine to hold said switch closed, and means responsive to electric load on the generator for operating the other switch and effective under normal conditions of load thereon to hold said switch open.

4. In an emergency governor for a turbine driving an electric generator, means including a solenoid effective to control the turbine, an electric circuit for the solenoid, a pair of electric switches effective when both are closed to complete the circuit and energize the solenoid, means responsive to pressure within the turbine for operating one of the switches and effective upon normal conditions of pressure in the turbine to hold said switch closed, and a wattmeter relay device for operating the other switch and effective under normal conditions of electric load on the generator to hold said switch open.

5. In an emergency governor for a turbine driving an electric generator, means including a solenoid effective to control the turbine, a circuit for energizing the solenoid, a normally open electrically controlled switch in the circuit, a second circuit effective when completed to operate the electric control of the first mentioned circuit and complete said circuit, a pair of switches in series in the second circuit, means responsive to pressure within the turbine for controlling one of the switches and effective under normal conditions of pressure within the turbine to hold said switch closed, and means responsive to the electric load on the generator for operating the other switch, said last mentioned switch being normally open and said last mentioned means being effective to close said switch on a reduction of load on the generator.

6. In an emergency governor for a turbine driving an electric generator, electrically operated means effective to control the turbine, a circuit for the electrically operated means, and means responsive to an operating condition of the turbine which varies with the load thereon together with means responsive to variations in electric load on the generator for controlling the circuit.

7. In an emergency governor for a turbine driving an electric generator, means including a solenoid effective to control the turbine, an electric circuit for the solenoid, a pair of electric switches effective when both are closed to complete the circuit and energize the solenoid, means responsive to an operating condition of the turbine varying with the load carried thereby for operating one of the switches and effective upon normal load conditions of the turbine to hold the switch closed, and means responsive to electric load on the generator for operating the other switch and effective under normal conditions of load thereon to hold said switch open.

8. The combination with a prime mover having a valve controlling the flow of motive fluid therethrough and driving an electric generator, of a governing mechanism for controlling the valve and including a speed-responsive governor, means responsive to the electric load on the generator for exerting a controlling effect on the valve, and means responsive to an operating condition of the prime mover which is a function of the load carried thereby for rendering said first-mentioned means inoperative.

9. The combination with a prime mover having a valve controlling the flow of fluid therethrough and driving an electric generator, of a governor mechanism for the valve including a speed-responsive governor normally controlling the valve, means responsive to an operating condition of the generator varying with the load thereon for exerting a controlling effect on the valve to close the same, and means responsive to a load condition of the prime mover for rendering the first mentioned means inoperative.

10. In a governing mechanism for an elastic fluid prime mover driving an electric generator, the combination of a governor for normally controlling the admission of motive fluid to the turbine in accordance with an operating condition thereof, means responsive to reduction in load on the generator for shutting off the admission of motive fluid to the turbine, and other means responsive to a load condition of the prime mover for rendering the first mentioned means inoperative.

11. The combination with a prime mover having a valve controlling the flow of fluid therethrough and driving an electric generator, of a governing mechanism for the valve comprising a speed-responsive governor normally controlling the valve, solenoid-operated means capable of exerting a controlling effect on the valve, an electric circuit controlling said solenoid-operated means, means in said circuit for controlling the same in response to the load on the electric generator, and other means in said circuit to render the same unaffected by the load-responsive means and controlled by a load condition of the turbine.

WILLIAM INNES.